(12) United States Patent
Miura et al.

(10) Patent No.: US 8,535,114 B2
(45) Date of Patent: Sep. 17, 2013

(54) METHOD FOR MANUFACTURING A PRECURSOR LENS FOR A RIM-SHAPED LENS

(75) Inventors: Hitoshi Miura, Okazaki (JP); Teruaki Fujii, Okazaki (JP); Takuya Kano, Okazaki (JP)

(73) Assignee: Tokai Optical Co., Ltd., Aichi (JP)

( * ) Notice: Subject to any disclaimer, the term of this patent is extended or adjusted under 35 U.S.C. 154(b) by 393 days.

(21) Appl. No.: 12/737,309

(22) PCT Filed: May 18, 2009

(86) PCT No.: PCT/JP2009/059139
§ 371 (c)(1),
(2), (4) Date: Dec. 28, 2010

(87) PCT Pub. No.: WO2010/001662
PCT Pub. Date: Jan. 7, 2010

(65) Prior Publication Data
US 2011/0107884 A1    May 12, 2011

(30) Foreign Application Priority Data

Jul. 2, 2008   (JP) .................................. 2008-172904

(51) Int. Cl.
*B24B 49/00*   (2012.01)
*B24B 51/00*   (2006.01)

(52) U.S. Cl.
USPC ..................... 451/5; 351/159.74; 351/159.77; 451/8; 451/43; 451/44; 700/157

(58) Field of Classification Search
USPC .............. 65/61; 351/159.73, 159.74, 159.75, 351/195.76, 159.77; 451/5, 8, 42, 43, 44; 700/157
See application file for complete search history.

(56) References Cited

U.S. PATENT DOCUMENTS

| 5,450,335 A * | 9/1995 | Kikuchi .......................... 702/168 |
| 6,688,944 B2 * | 2/2004 | Hatano et al. ..................... 451/5 |

(Continued)

FOREIGN PATENT DOCUMENTS

| JP | 11-010501 | 1/1999 |
| JP | 2002-126985 | 5/2002 |

(Continued)

OTHER PUBLICATIONS

International Search Report issued in International Application No. PCT/JP2009/059139, dated Jul. 28, 2009 (2 pages).
International Preliminary Report on Patentability (IPRP) issued in International Application No. PCT/JP2009/059139, dated Feb. 8, 2011 (4 total pages).

*Primary Examiner* — Timothy V Eley
(74) *Attorney, Agent, or Firm* — Martine Penilla Group, LLP

(57) ABSTRACT

A method for manufacturing an externally circular precursor lens that is processed into a rim-shaped lens includes inputting processing data to specify the shape of the rim-shaped lens, and processing a material block based on the processing data so as to manufacture a precursor lens. An elliptical virtual rim surrounding the precursor lens manufactured at that time is imaginarily set, and is processed based on the processing data up to that range, and, outside the virtual rim, an amount of sag is changed to secure the edge thickness of the precursor lens. This method for manufacturing a precursor lens for a rim-shaped lens reduces an excessive load imposed on a processing tool during processing, allows the precursor lens to be processed into a rim-shaped lens while satisfactorily maintaining its edge thickness without the lack of the edge of the precursor lens, and results in a thin lens.

19 Claims, 11 Drawing Sheets

(56) References Cited

U.S. PATENT DOCUMENTS

| | | | |
|---|---|---|---|
| 7,128,638 B2 * | 10/2006 | Siders et al. | 451/5 |
| 7,295,886 B2 * | 11/2007 | Shibata | 700/157 |
| 2002/0045403 A1 | 4/2002 | Hatano et al. | |
| 2003/0181133 A1 * | 9/2003 | Siders et al. | 451/5 |
| 2007/0118428 A1 * | 5/2007 | Akiyama et al. | 705/26 |
| 2010/0105293 A1 * | 4/2010 | Hamanaka et al. | 451/43 |

FOREIGN PATENT DOCUMENTS

| | | |
|---|---|---|
| JP | 2002-239882 | 8/2002 |
| JP | 2006-267316 | 10/2006 |
| JP | 2007-240553 | 9/2007 |

\* cited by examiner (a)

(b)

(a)

(b)

(a)

(b)

METHOD FOR MANUFACTURING A PRECURSOR LENS FOR A RIM-SHAPED LENS

TECHNICAL FIELD

The present invention relates to a method for manufacturing a precursor lens that is commonly called a "round lens" and that is pre-produced to obtain a rim-shaped lens.

BACKGROUND ART

Generally, in a lens manufacturer, prescription data (i.e., ordering data) relative to spectacle lenses for a user (a person to wear spectacles) is obtained from a spectacles shop that is a client, and, based on the prescription data, a precursor lens that is commonly called a "round lens" is made and supplied to the spectacles shop. In the spectacles shop, the periphery of the precursor lens is cut to be fitted in a spectacle rim selected by the user so as to obtain a rim-shaped lens (note that there is also a case in which even this rim-shaped lens is processed by the lens manufacturer).

A technique in which the periphery of a precursor lens is cut so as to produce and leave only a rim-shaped lens from the precursor lens is well known as mentioned above, and Patent Document 1 is shown as one such example.

The term "rim-shaped lens" mentioned here denotes a lens obtained by processing a precursor lens so as to be shaped to be fitted in the inner peripheral shape of a spectacle rim. The term "round lens" is a commonly-used name for a precursor lens, derived from the fact that its external shape is formed in a circular or elliptical shape in consideration of handling.

Conventionally, the entire lens surface of a precursor lens (i.e., a round lens) has been processed according to processing data set for a rim-shaped lens. In other words, a part around a rim-shaped lens that is an unnecessary part to be cut in a step of the manufacturing process has also been processed based on processing data relative to the rim-shaped lens.

PRIOR ART DOCUMENTS

Patent Documents

Patent Document 1: Japanese Published Unexamined Patent Application No. 2006-267316

SUMMARY OF THE INVENTION

Problems to be Solved by the Invention

Basically, it is preferable for a rim-shaped lens to have a small edge thickness as long as there is no hindrance in fitting the rim-shaped lens in a spectacle rim. For example, in a plus lens, its center thickness is larger than its edge thickness, and therefore its center thickness can be made small by setting its edge thickness to be small, and, as a result, a lightweight, good-looking rim-shaped lens can be obtained. However, as described above, a precursor lens is first made in a process for manufacturing a rim-shaped lens, and therefore, if the thickness of an edge part of the rim-shaped lens is set to be too small, a case will arise in which an outer part surrounding the edge part is eliminated, and the external shape of the precursor lens that is circular or elliptical cannot be maintained. Alternatively, even if the external shape of the precursor lens is kept in a circular or elliptical shape, a case will arise in which a part near the edge part is formed very thinly.

The lack or thinness of the edge of the precursor lens causes the following troubles in processing the precursor lens.

1) For example, a precursor lens is made by applying a cutting operation onto a material block that is called a semifinish, which has undergone convex processing, and that has the same diameter as the precursor lens, and, generally, the material block must be sucked and fixed by using only its convex surface opposite to its surface to be processed. Therefore, a suction element of a fixing device widely covers the lens surface in order to increase a fixing force. Therefore, there has been a case in which if the edge of the precursor lens is eliminated, the suction element will be exposed toward the surface to be processed. If this case arises, there has been a possibility that a cutting tool will come into contact with the suction element, and the lens will be damaged when a cutting operation is performed.

2) If an area in which the material block is covered with the suction element is reduced to allow the cutting tool and the suction element to come into contact with each other, there has been a possibility that the lens will be bent by a stress generated when a cutting operation is performed, and processing accuracy will be lowered.

3) If the edge of the precursor lens is too thin, there has been even a case in which the lens is not only bent but also broken by a stress generated when a cutting operation is performed. Additionally, if the edge of the precursor lens is too thin, there is a possibility that the lens will be broken not only when a processing operation is performed but also when a conveying operation or the like is performed. If the lens is broken, there has been a case in which its lens surface is damaged by broken lens pieces.

4) If the edge of the precursor lens is in a broken state in an immersing step of immersing the lens in a hard-coating liquid after having performed a cutting operation, the coating liquid will stay in broken lens parts, and liquid dripping will be caused. Additionally, if broken pieces of the lens mix with the coating liquid, there is a possibility that these pieces will adhere to the lens surface when the lens is immersed in the coating liquid, and defective products will be manufactured.

Because these problems have existed, a precursor lens has been conventionally manufactured in such a way as to avoid the lack of the edge of the precursor lens or avoid the extreme thinness of the lens as much as possible and as to secure the thickness of its edge unless a client intensely desires to thin the lens. However, this way leads to the production of a heavy, bad-looking rim-shaped lens. Therefore, there has been demand for a precursor lens whose edge is not eliminated and whose thickness becomes small when the precursor lens is processed into a rim-shaped lens while satisfactorily maintaining its edge thickness.

To solve the above-mentioned problems, the present applicant filed a patent application (Japanese Patent Application No. 2007-27430) dated Feb. 7, 2007.

According to this application, in a case in which the thickness of the edge of a precursor lens will be lost or become very small if the lens is processed based on processing data about a designed rim-shaped lens, a part surrounding the rim-shaped lens part is processed while correcting the processing data so that the edge thickness of the precursor lens becomes larger than a predetermined thickness. This makes it possible to solve the above-mentioned problems.

However, there is a case in which an excessive load will be imposed on the processing device depending on the shape of the rim-shaped lens if the correction is performed from a position closest to the outer edge of the rim-shaped lens. For example, in a precursor lens having the shape of a rim-shaped lens shown in FIG. 13, a sharply curved part indicated by arrow "p" is a part on which a shape change in horizontal and vertical directions converges, and therefore a change in the shape of the lens surface is large (i.e., a mountain-like or valley-like shape is formed in comparison with the shape of its surrounding part), and, presumably, the acceleration applied onto a processing tool that passes this place at a time of proceeding/receding becomes large, and an excessive load is imposed on the processing tool or on the mechanism of an NC lathe device.

Therefore, an improvement by which such large acceleration is not generated has been required.

The present invention has been made in consideration of the problems that reside in the conventional technique. It is a first object of the present invention to provide a method for manufacturing a precursor lens for a rim-shaped lens in which the precursor lens is processed into a rim-shaped lens while satisfactorily maintaining its edge thickness without the lack of the edge of the precursor lens, and a resulting lens is thin. It is a second object of the present invention to provide a method for manufacturing a precursor lens for a rim-shaped lens in which an excessive load imposed on a processing tool is reduced when such processing is performed.

Means for Solving the Problems

To solve the above-mentioned problems, the invention of claim 1 is a method for manufacturing a precursor lens for a rim-shaped lens in which the precursor lens has a circular or elliptical external shape, in which the precursor lens is processed into a rim-shaped lens by cutting off a peripheral edge thereof so as to be fitted in a predetermined spectacle rim, and in which the precursor lens is provided with rotationally asymmetric lens characteristics corresponding to a prescription of a user, and the invention of claim 1 is characterized in that the method includes a processing data input step of inputting data to specify at least a shape of the rim-shaped lens, and a precursor lens manufacturing step of manufacturing the precursor lens by processing a material block by a processing means based on processing data of the rim-shaped lens, wherein an upper borderline and a lower borderline are imaginarily set to be extended in a rightward/leftward direction with a predetermined interval therebetween in an upper part and a lower part, respectively, of a rim shape of the rim-shaped lens, wherein processing is performed while reflecting the processing data until the borderlines are reached, and wherein parts outside the borderlines are processed while correcting the processing data so that an edge thickness of the manufactured precursor lens securely becomes larger than a predetermined thickness.

The invention of claim 2 is characterized in that, in addition to the structure of the invention of claim 1, the upper borderline and the lower borderline are respectively virtual curves located at positions facing each other with a lens center therebetween, each serving as a part of a curve defined by I) or II) mentioned below:
I) a single ellipse or circle,
II) an outwardly convex closed-curve shape that does not make self-crossing and that is obtained by combining together parts of a plurality of curves selected from a single or a plurality of ellipses, circles, and hyperbolas so as to obtain a smooth continuity.

The invention of claim 3 is characterized in that, in addition to the structure of the invention of claim 1, at least one of the upper and lower borderlines is a straight line extended in the rightward/leftward direction.

The invention of claim 4 is characterized in that, in addition to the structure of the invention of any one of claims 1 to 3, each of the upper and lower borderlines has a contact point being in external contact with a rim shape of the rim-shaped lens or a proximity point close thereto.

The invention of claim 5 is characterized in that, in addition to the structure of the invention of any one of claims 1 to 4, the material block has a predetermined convex or concave surface to be processed that has been pre-formed, and, in the step of manufacturing the precursor lens, processing is applied by the processing means onto either the convex or the concave surface to be processed.

The invention of claim 6 is characterized in that, in addition to the structure of the invention of any one of claims 1 to 5, the surface to be processed is an inner surface side of the lens in the step of manufacturing the precursor lens.

The invention of claim 7 is characterized in that, in addition to the structure of the invention of claim 6, correction of the processing data denotes setting a lens-inner-surface-side curve in a lens cross section that passes through a lens center area so as to become deeper outside the borderlines than inside the borderlines.

The invention of claim 8 is characterized in that, in addition to the structure of the invention of claim 7, setting a curve so as to become deeper outside the borderlines than inside the borderlines denotes that a curve obtained when the processing data is corrected becomes deeper outside the borderlines than a curve obtained when the processing data is not corrected.

The invention of claim 9 is characterized in that, in addition to the structure of the invention of claims 7 and 8, a second borderline is imaginarily set outside each of the borderlines, and a deep curve set outside each of the borderlines is corrected so as to become shallower outside the second borderline.

The invention of claim 10 is characterized in that, in addition to the structure of the invention of claim 9, a cross-sectional shape near an edge of the precursor lens corrected outside the second borderline is convex.

The invention of claim 11 is characterized in that, in addition to the structure of the invention of any one of claims 1 to 10, parts around the rim-shaped lens part processed in the step of manufacturing the precursor lens have at least an area that is contiguous to the rim-shaped lens part and that is continuous in all directions.

In each structure mentioned above, in order to manufacture a precursor lens, processing data to specify the shape of a rim-shaped lens corresponding to the prescription of a user is input in the processing data input step. The use of rim shape data and edge thickness data concerning a rim-shaped lens in a final processed state as this processing data is calculatively advantageous to the present invention. However, without being limited to these pieces of data, it is also possible to use various pieces of data, such as lens center thickness, lens edge thickness of the precursor lens, lens curve, progressive corridor length, additional power, interpupillary distance, spherical power, astigmatic power, and direction of an astigmatic axis.

On the manufacturer side, a material block is processed into a precursor lens by use of a processing means based on those pieces of processing data in the precursor lens manufacturing step. The processing means is a means, such as an NC lathe device, that is provided with a processing tool, such as a cutting tool or a grinding tool, and that is capable of controlling the processing tool based on the processing data.

At this time, borderlines are imaginarily set so as to be extended substantially in the horizontal direction in upper and lower parts of the rim shape, respectively, with a predetermined interval therebetween. Processing is performed while reflecting the processing data up to the borderlines. Parts outside the borderlines are processed while correcting the processing data so that the edge thickness of the precursor lens can become larger than a predetermined thickness. In other words, this is a processing method according to which an area exactly according to the processing data is provided around the rim shape (the rim-shaped lens shape), and then a deformed part differing from the processing data is provided outside this area. The upper and lower borderlines are not necessarily required to exist at an equal distance from the geometrical center of the precursor lens. Additionally, the upper and lower borderlines are not required to be parallel to each other. However, preferably, the upper and lower borderlines are positioned as close as possible to the outline of the rim shape because an abrupt change in shape outside the borderlines is not caused.

As a result, even if processing is first performed so that the edge thickness of the rim-shaped lens part becomes small, the edge thickness of the precursor lens can remain larger than a predetermined thickness, and therefore the edge of the precursor lens is never eliminated, and is never thinned to such an extent that it cannot bear up against processing.

Next, processing can be performed while reflecting the processing data up to the borderlines regardless of how the shape of the rim-shaped lens is formed, and parts outside the borderlines are required merely to change an amount of sag while using the borderline extended in the rightward/leftward direction as a boundary. A change in shape of the lens surface is not too large at the position of the borderline, and therefore an excessive load is never imposed on the processing tool and on the mechanism of the NC lathe when the lens surface is processed. The term "rightward/leftward direction" mentioned above denotes a direction from the ear side of the lens toward the nose side.

The precursor lens manufactured through these steps is a precursor lens, such as a progressive refracting-power lens, to which rotationally asymmetric lens characteristics are given. Although it is a technique universally usable especially in a plus lens whose center thickness is larger than its edge thickness, it is usable in a lens having a large prism amount or in a progressive refracting-power lens having large additional power even if the lens is a minus lens.

Additionally, the line shape of each of the upper and lower borderlines is not limited to a specific line shape, and, preferably, is a single ellipse or circle, or is an outwardly convex closed-curve shape that does not make self-crossing and that is obtained by combining together parts of a plurality of curves selected from a single or a plurality of ellipses, circles, and hyperbolas so as to obtain a smooth continuity. A calculation can be easily performed by regarding the borderline as a part of these virtual shapes when a borderline having a curve degree close to the rim shape is set. When these virtual shapes deviate and protrude in the rightward/leftward direction of the precursor lens, a curved part existing in the precursor lens is used as a borderline. The term "not make self-crossing" denotes excluding a shape, such as numeral "8," including a crossed part in the design.

A virtual closed curve D, such as that shown in FIG. 14 (a), can be mentioned as a possible example of "an outwardly convex closed-curve that does not make self-crossing and that is obtained by combining together parts of a plurality of curves selected from a single or a plurality of ellipses, circles, and hyperbolas so as to obtain a smooth continuity." This virtual closed curve D is formed by combining together ¼ of each of four kinds of ellipses. This is formed, for example, in the following manner. Assume an ellipse that has its center coinciding with the geometrical center O of the lens and that has predetermined long and short diameters surrounding the shape of the rim-shaped lens (FIG. 14 (b)). Thereafter, the upper half of the ellipse is changed into an ellipse having a reduced short diameter by a straight line L1 coinciding with the direction of the long diameter passing through the geometrical center O (FIG. 14 (c)). Furthermore, its right half is changed into an ellipse having a reduced long diameter by a straight line L2 coinciding with the direction of the short diameter passing through the geometrical center O, thus obtaining the virtual closed curve D. Preferably, the number of curves used to form the virtual closed curve is four or so because many kinds of curves complicate the shape although, theoretically, no limitations are imposed on the number of curves combined together for the virtual closed curve. Preferably, this virtual closed curve is used especially when a lens having a prism prescription is manufactured.

If an outwardly convex closed curve that does not make self-crossing is formed by a plurality of ellipses, circles, and hyperbolas in this way, an unwasted shape more suitable for the shape of the rim-shaped lens can be set.

This virtual shape is not necessarily required to pass through the ear side and the nose side of the rim shape of the rim-shaped lens inside the external shape of the precursor lens. In other words, whether the virtual shape strays from the precursor lens as in FIG. 15 (a) or the virtual shape does not stray therefrom as in FIG. 15 (b) is not important.

Additionally, the upper and lower borderlines may be straight lines extended in the rightward/leftward direction. The upper and lower borderlines may be completely horizontal lines, or may be not completely horizontal lines, or may be parallel to each other, or may be not parallel thereto.

Additionally, preferably, each of the upper and lower borderlines has a contact point being in external contact with a rim shape of the rim-shaped lens or a proximity point close thereto. The reason is that a wasteful extension of an area from the rim shape to the borderline is removed as mentioned above. Additionally, proximity to the rim shape without contact therewith makes it possible to give a processing tolerance.

Herein, preferably, a material block that is a base to manufacture a precursor lens has a predetermined convex or concave surface to be processed, and, in the step of manufacturing the precursor lens, processing is applied onto either the convex or the concave surface to be processed. In other words, preferably, processing is applied onto either a surface on the outer surface (object) side of the material block or a surface on the inner surface (eyeball) side of the material block in the step of manufacturing the precursor lens. A processing process is simplified by allowing a processing means to face the surface that is not a pre-processed surface as a lens surface as mentioned above. Preferably, the surface to be processed is an inner surface side of the lens.

When processing data is corrected while processing the inner surface side of the lens, a curve on the inner surface side of the lens in the lens cross section that passes through a lens center area is set to be deeper outside the borderline than a curve set inside the borderline. More specifically, a curve that has undergone correction of processing data outside is set to become deeper than a curve set without correcting the processing data. The term "lens center area" denotes an area that is not necessarily required to be a concrete point, such as a geometrical center or a fitting point, and by which the cross-sectional shape in the radial direction of the lens can be specified.

Preferably, in this case, the curve is corrected to become shallower in second borderlines imaginarily set outside the above-mentioned borderlines without setting the curve to be entirely deep up to the edge of the precursor lens to be manufactured. In other words, it is conceived that the curve that has been temporarily deepened is gradually returned to the original state (i.e., to about the angle of the curve set inside it), or is brought into a reverse curve (i.e., into a convex shape) in such a manner that the edge is not eliminated or is not excessively thinned. No limitations are likewise imposed on the line shape of each of the second borderlines, and, preferably, the line shape is a single ellipse or circle, or is an outwardly convex closed-curve shape that does not make self-crossing and that is obtained by combining together parts of a plurality of curves selected from a single or a plurality of ellipses, circles, and hyperbolas so as to obtain a smooth continuity. Additionally, each of the second borderlines may be a straight line extended in the rightward/leftward direction. The upper and lower borderlines may be completely horizontal lines, or may be not completely horizontal lines, or may be parallel to each other, or may be not parallel thereto.

As a result, the edge can be prevented from being uselessly thickened, and the contact position of a tool of a processing means with the surface of the material block does not easily become unfixed, and, when the processing means is allowed to perform processing, the processing means can accurately perform processing.

Additionally, preferably, in parts surrounding the rim-shaped lens part to be processed in the precursor lens manufacturing step, an area contiguous to at least the rim-shaped lens part is continuous in all directions. In other words, preferably, the rim-shaped lens part is smoothly connected to parts around the rim-shaped lens part without producing a level difference or an angular state, and the entire area of the parts therearound that is contiguous to the rim-shaped lens part is also smooth without producing a level difference or an angular state. Therefor, an amount of correction to an area contiguous to at least the rim-shaped lens part of a surrounding part, which is added to an amount of sag to be processed based on processing data, is required to be expressed by a quadratic function or a higher-dimensional function.

Effects of the Invention

In each claimed invention, even if the edge of the rim-shaped lens part is processed to be thinned as much as possible, the edge thickness of the precursor lens can be kept larger than a predetermined thickness, and therefore the edge of the precursor lens is never eliminated or is never thinned to such an extent that it cannot bear up against processing. Therefore, unlike the conventional technique, the edge is not eliminated to sufficiently thin the rim-shaped lens, or an extremely thin precursor lens is not manufactured, or on the contrary, the rim-shaped lens is never excessively thickened to secure a sufficient edge thickness of the precursor lens.

Additionally, borderlines extended in the rightward/leftward direction are respectively provided at the upper and lower positions of the rim-shaped lens, and an area up to the borderlines is set as an area in which processing is performed according to processing data, and a deformed part differing from the processing data is provided outside the area. Therefore, a change in shape of the lens surface at the borderline position does not become large, and therefore an excessive load is not imposed on a member that is a constituent of a processing means when the lens surface is processed.

MODES FOR CARRYING OUT THE INVENTION

An embodiment in which the method of the present invention is carried out will be hereinafter described.

Figure 1:
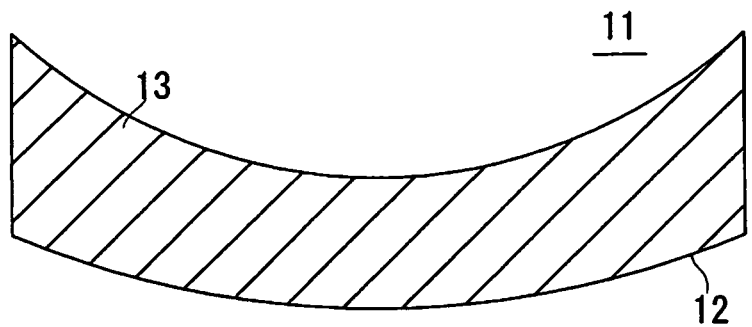
FIG. 1 is an end view in a diameter position for describing the cross-sectional shape of a material block used in each example of the present invention.

A precursor lens in this embodiment is obtained by cutting a material block 11 that is called a "semifinish" and that has a sufficient thickness as shown in FIG. 1 by use of a CAM (computer aided manufacturing) device not shown. The planar shape of the material block 11 is circular in this embodiment, and its front surface is a convex processed surface 12 that has been spherically preprocessed with a predetermined curvature. Its back surface is a concave processed surface 13 that has been spherically preprocessed with a predetermined curvature.

In this embodiment, shape data of the material block 11 is input to the CAM device, processing data is then created based on the shape data, the convex processed surface side (12) is then fixed to a fixing device, and the concave processed surface side (13) is processed based on the processing data.

The material block 11 that has undergone cutting processing is further subjected to smoothing processing and polishing processing onto its cut surface so as to form a smooth processed surface, thus obtaining a precursor lens 15. In other words, before and after undergoing processing, the material block 11 and the precursor lens 15 coincide with each other in the planar shape and in the shape on the convex side (i.e., on the outer surface side). Furthermore, already-known surface coating is applied onto this precursor lens 15. In this embodiment, the surface coating is performed in such a way that a hard film is first formed, and then a multi film is formed on the outside thereof.

With respect to the precursor lens 15 obtained through these processing steps, shape data of a lens surface to be processed is calculated according to the following technique so that the above-mentioned processing data is formed.

Figure 2:
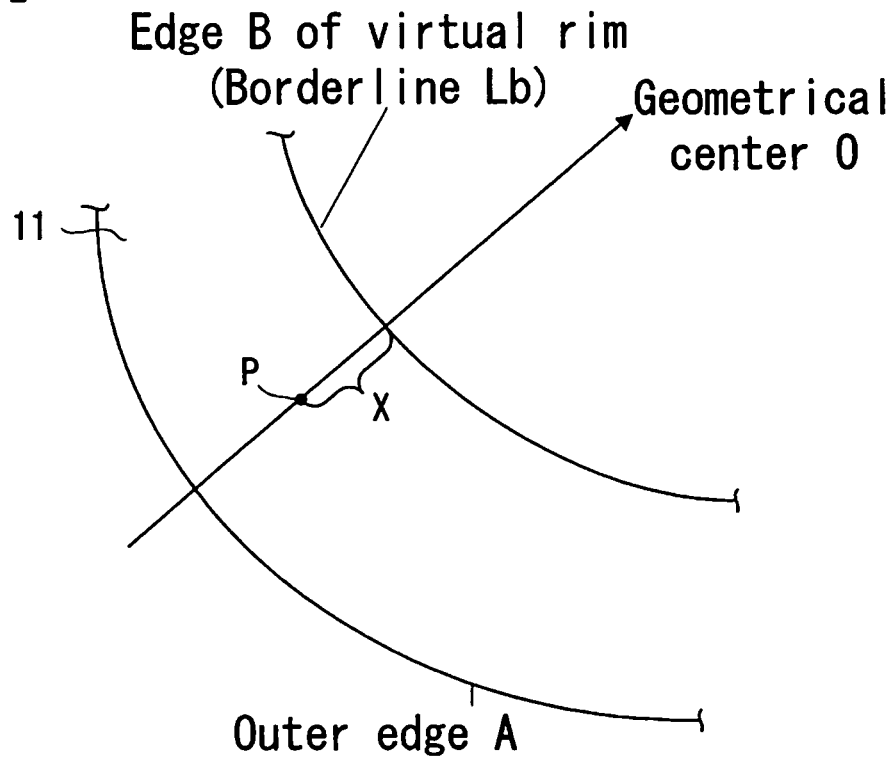
FIG. 2 is a descriptive view for describing a method for obtaining shape data in a circumferential direction in Example 1.

As shown in FIG. 2, let it be supposed that there is a straight line extending from the outside of the lens toward a fitting point (or a geometrical center) of the lens. A desired shape of a lens cross section obtained by being cut by this straight line is simulated. In the present invention, it is supposed that there is an elliptical rim shape rightwardly/leftwardly having a longer diameter toward the outside than an actual rim, and processing ranging from the first step to the step of this virtual rim is performed based on processing data of a rim-shaped lens. The outside of the virtual rim is processed by giving an amount of sag to the processing data. The term "amount of sag" mentioned here denotes a processing displacement magnitude with respect to a to-be-processed surface based on the processing data. In this embodiment, an amount of sag is calculated based on the following theory.

Figure 3:
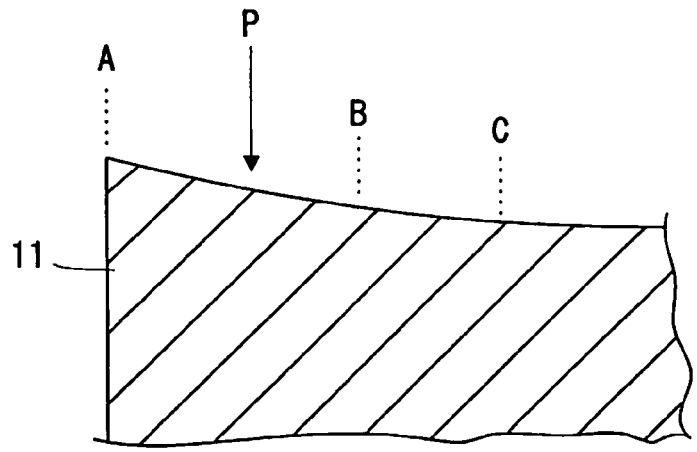
FIG. 3 is a descriptive view for describing a method for obtaining shape data in a cross-sectional direction of a rim-shaped lens in Example 1.

As shown in FIG. 3, in the positional relationship among an outer edge A of the material block 11, an edge position B of the virtual rim, and an edge position C of the rim-shaped lens, a straight line is drawn from an arbitrary point P between the outer edge A of the material block 11 and the edge position B of the virtual rim toward the geometrical center O of the material block 11 (the precursor lens 15). At this time, based on the edge position B of the virtual rim on the straight line, the arbitrary point P can be specified because the shape of the virtual rim has been specified. Here, let the distance between the arbitrary point P and the edge position B of the virtual rim be x. Thereafter, an amount of sag is calculated by substituting x for a given calculation formula. Preferably, this calculation formula is a multidimensional function in order to make the entire surface smoothly continuous. For example, if the calculation formula is a quadratic function, the general formula can be expressed as $f_1(x)=ax^2+bx+c$, and, if the calculation formula is a cubic function, the general formula can be expressed as $f_2(x)=ax^3+bx^2+cx+d$.

Additionally, it is recommended to, when an amount of sag is added, perform a calculation not by one kind of function but by a plurality of kinds of functions combined together so as to obtain an optimum sag shape. For example, to avoid an acute change in shape, a part close to the edge position C of the rim-shaped lens is set so that the amount of sag is small, and, in contrast, the outer edge A of the material block 11 is set not to become too thick. This respect will be described later.

This calculation is performed for all parts ranging from the edge position B of the virtual rim to the outer edge A of the material block 11, and data concerning the shape of the back surface of the lens that is three-dimensional as a whole is obtained along with shape data based on the processing data of the rim-shaped lens up to the step of the virtual rim. Processing data is formed based on the thus obtained shape data while using the CAM device, and, based on the resulting processing data, cutting and grinding operations are performed by use of the milling machine.

Next, a processing method for processing the precursor lens 15 by use of a processing means will be briefly described. Although a generally-used NC milling machine is used as the processing means in this embodiment, another NC machine capable of cutting or grinding can be used.

Figure 6:
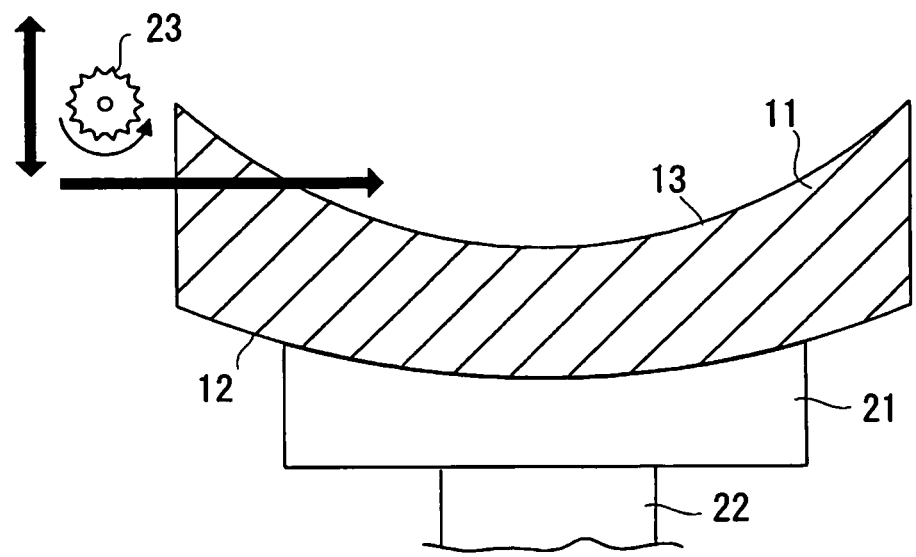
FIGS. 6 (a) and 6 (b) are descriptive views for describing a movement of a milling cutter when a material block is processed with an NC milling machine that serves as a processing means.
Figure 6:
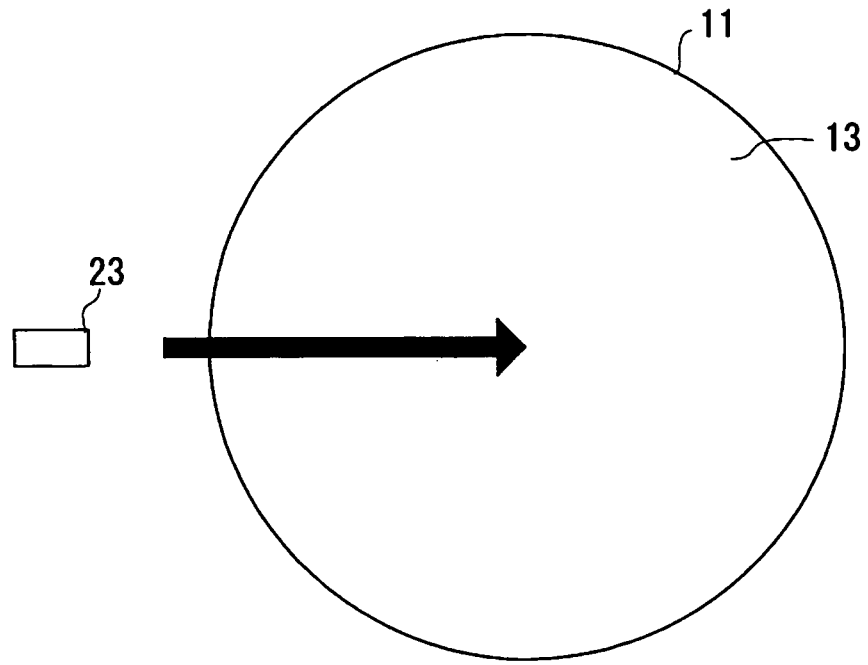

As shown in FIGS. 6 (a) and 6 (b), the precursor lens 15 is held by a holder 21 while directing its convex surface side downwardly.

The holder 21 is set on a rotational shaft 22, and is unidirectionally rotated together with the precursor lens 15. A milling cutter 23 serving as a cutting tool (a processing tool) on the NC milling machine side is disposed at a predetermined position that is an original position and that is located outside the precursor lens 15 with a rotation axis having a predetermined angle (herein, the rotation axis is set at 0° with respect to a horizontal plane). The milling cutter 23 moves toward the geometrical center O of the precursor lens 15 while rotating counterclockwise in the figure so as to rake out swarf toward the outside of the precursor lens 15. However, practically, whether its rotational direction is a clockwise direction or an counterclockwise direction is not indispensable, and may be clockwise. The milling cutter 23 adjusts an amount of cutting by moving upwardly and downwardly with respect to the to-be-processed surface (i.e., concave side) of the precursor lens 15. Although an amount of cutting is adjusted by moving the milling cutter 23 herein, the precursor lens 15 may be moved upwardly and downwardly while fixing the milling cutter side (23) in a manner opposite to the above manner.

Next, a description will be given of Example 1 that is a concrete example carried out based on the above-mentioned embodiment.

Example 1

In Example 1, a description will be given of a case in which a plus SV (single vision) lens having astigmatic power is manufactured, to which the present invention is applied.

In Example 1, the following rim-shaped lens is manufactured on the assumption that a precursor lens 15 that has the following characteristics data is manufactured by processing a material block 11.

Rim-shaped lens prescription S: +0.00D, C: +3.00D, AX: 180

Curvature radius of surface curve 86.6 mm

Material refractive index 1.6

Horizontal/vertical distance from fitting point of rim-shaped lens edge Ear side: 27 mm, Nose side: 23 mm, Upper side: 11 mm, Lower side: 14 mm The precursor lens 15 is set as follows.

Diameter of precursor lens (i.e., diameter of the material block 11) 62 mm

Center thickness of precursor lens 1.8 mm (i.e., center thickness at the geometrical center. In Example 1, the geometrical center and the fitting point coincide with each other.)

Edge thickness of rim-shaped lens Ear side: 1.9 mm, Nose side: 1.9 mm, Upper side: 1.5 mm, Lower side: 1.2 mm Maximum edge thickness of precursor lens Ear side: 2.0 mm, Nose side: 2.0 mm Minimum edge thickness of precursor lens Upper side: 0.6 mm, Lower side: 0.6 mm Additionally, in Example 1, a virtual rim shape L was set around the edge position C of the rim-shaped lens. The virtual rim shape L is an ellipse having a long diameter perpendicular to a vertical axis of the precursor lens 15 and a short diameter perpendicular to a horizontal axis of the precursor lens 15, and its center coincides with the geometrical center of the precursor lens 15. In Example 1, the elliptical shape of the virtual rim shape L was set to have a long diameter of 95 mm and a short diameter of 32 mm, and therefore the virtual rim shape L deviates and protrudes in the rightward/leftward direction of the precursor lens 15. A curved part of the virtual rim shape L that exists in the precursor lens 15 corresponds to a borderline Lb. The virtual rim shape L comes nearest to the edge position C of the rim-shaped lens at a position near the ear side of the lower part of the shape of the rim-shaped lens (i.e., at a position shown by N in FIG. 4). In Example 1, position "N" is slightly away from (i.e., is close to) the edge position C of the rim-shaped lens without coming into contact with the edge position C.

Vertical distance from the edge of the rim-shaped lens on the vertical line passing through the fitting point to the virtual rim shape L (the borderline Lb) Upper side: 6 mm, Lower side: 2 mm On the other hand, to make a comparison/contrast with Example 1, a conventional precursor lens was simulated as follows based on the above-mentioned rim-shaped lens prescription, the curvature radius of the surface curve, the diameter of the precursor lens, and the center thickness of the precursor lens. The conventional precursor lens was simulated to manufacture a rim-shaped lens prescribed as mentioned above, and therefore the entire inner surface of the conventional precursor lens serves as a toric surface.

Figure 4:
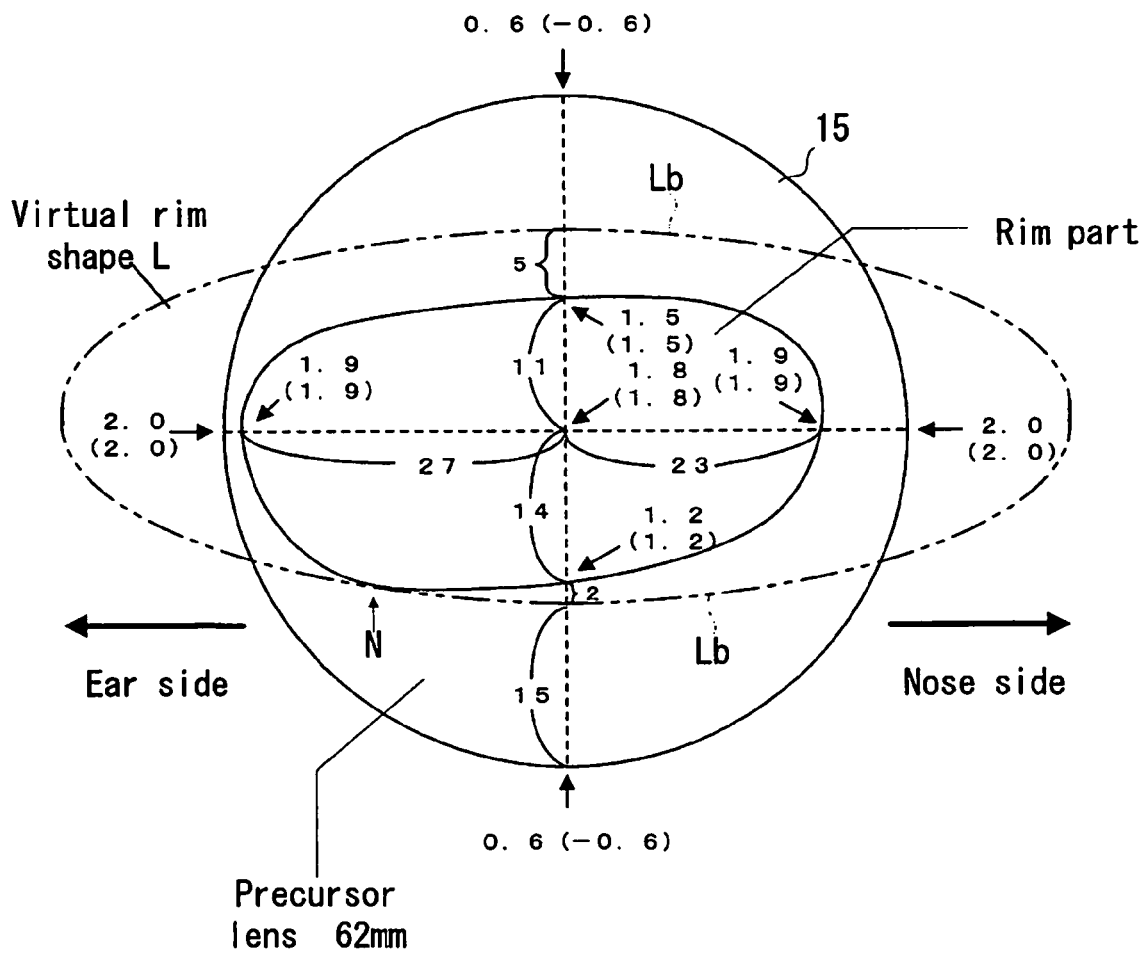
FIG. 4 is a descriptive view for describing numerical values of various data of Example 1 and a comparative example in a precursor lens.

Diameter of precursor lens 62 mm
Center thickness of precursor lens 1.8 mm
Edge thickness of rim-shaped lens Ear side: 1.9 mm, Nose side: 1.9 mm, Upper side: 1.5 mm, Lower side: 1.2 mm
Maximum edge thickness of precursor lens Ear side: 2.0 mm, Nose side: 2.0 mm
Minimum edge thickness of precursor lens Upper side: −0.6 mm, Lower side: −0.6 mm, Thickness at position of 27 mm upward or downward from center: 0 mm The comparison between Example 1 and the conventional precursor lens is shown in FIG. 4. In FIG. 4, numerical values in parentheses are data of the conventional precursor lens.

Next, a detailed description will be given of a concrete method for setting an amount of sag (i.e., displacement magnitude) in an area from the edge of the virtual rim shape L to the edge of the material block 11 (i.e., to the edge of the precursor lens 15).

The quantitative extent of sag can be determined based on a difference obtained by simulating a case in which sag is not given (i.e., displacement is not made). In Example 1, an amount of sag is calculated as follows based on the borderline Lb.

The amount of sag is 0 inside the borderline Lb. Let a point on a straight line for calculating an amount of sag from the geometrical center O be "P," and let the distance from point P to an intersection between the borderline Lb and the straight line be "x."

1. With Respect to the Range of x=0 to 5 mm

In Example 1, this range uses a cubic function in which a sag displacement of 1 mm is made when x=5 mm. Specifically, the following function was used.

$$f(x)=x^3/125 \quad \text{[Formula 1]}$$

When x=5, this function takes value 1, and the inclination (first order differential value) is 3/5, and the second order differential value is 6/25.

2. With Respect to the Range of x=5 to 10 mm

This range is placed to perform an adjustment so that an amount of sag does not become too large as mentioned above. In other words, this range uses a cubic function in which the curvature becomes 0 toward the outside with which smooth continuity is made about numerical formula 1. Specifically, the following function was used. When x=10 mm, this function takes value 6, and the inclination is 1.2.

$$f(x)=-(x-5)^3/125+(x-5)^2*3/25+0.6*(x-5)+1 \quad \text{[Formula 2]}$$

3. With Respect to the Range of x=10 mm or Larger

The curve is exactly 0 at the point of x=10 mm herein, and therefore, in this range, a state of having no curve is extended without changing this state. On the contrary, there is also significance to prevent the edge thickness from being too reduced.

As mentioned above, in numerical formula 2, the value is 6, and the inclination is 1.2 when x=10 mm. Therefore, a linear function in an area larger than x=10 mm can be expressed as follows.

$$f(x)=(x-10)*1.2+6.0 \quad \text{[Formula 3]}$$

Figure 5:
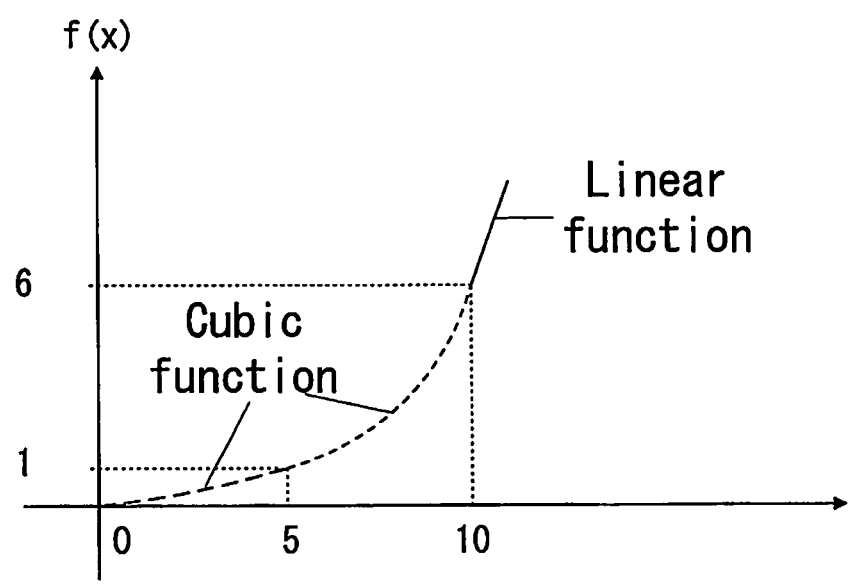
FIG. 5 is a characteristics graph of an amount of sag given to the outside of a borderline in Example 1.

FIG. 5 is a characteristics graph of an amount of sag in which the ordinate axis indicates an amount of sag, and the abscissa axis indicates a distance from the edge of the virtual rim shape L.

The step of setting an amount of sag can be concretely programmed as follows. Hereinafter, "a" denotes an amount of sag. Although the lens was designed so that an amount of sag becomes comparatively large for easy understanding, an actual amount of sag is set smaller than an amount obtained by this numerical formula.

if (x>10.) a=1.2*x−6.0; //10 mm or larger Linear function
else if (x>5.) a=−0.008*x*x*x+0.24*x*x−1.2*x+2.; //5 to 10 mm Opposite shape Cubic function
else if (x>0.) a=0.008*x*x*x; //0 to 5 mm Cubic function
else a=0.;

Next, a concrete description will be given taking, as an example, a cross-sectional shape on a straight line extended downwardly from the fitting point.

As mentioned above, the conventional precursor lens has a thickness of 1.2 mm at the point of 14 mm downward from the center, a thickness of 0.00 mm at the point of 27 mm downward therefrom, and a thickness of −0.6 (i.e., the lack of the edge) at the point of 31 mm downward therefrom (i.e., the edge position "A" of the precursor lens). Therefore, the necessary condition for securing a thickness of 0.6 mm at the point of 31 mm downward therefrom in Example 1 is to make displacement so as to become 1.2 mm thicker than the conventional one.

The borderline Lb on the lower side is 2 mm below from the edge of the rim-shaped lens, and therefore the same setting as the conventional precursor lens is employed to the extent of 16 mm of 14 mm+2 mm. It is necessary to adjust an amount of sag so as to have a thickness of 0.6 mm at 15 mm that is a length downward therefrom.

In Example 1, the above-mentioned numerical formula was used as a numerical formula to add an amount of sag. In other words, the curve is deep outside the point of 16 mm downward from the center.

The lens thickness up to the edge position "A" of the precursor lens based on a position 16 mm downward from the lens center is compared and shown in Table 1, taking the conventional precursor lens as a comparative example.

Figure 7:
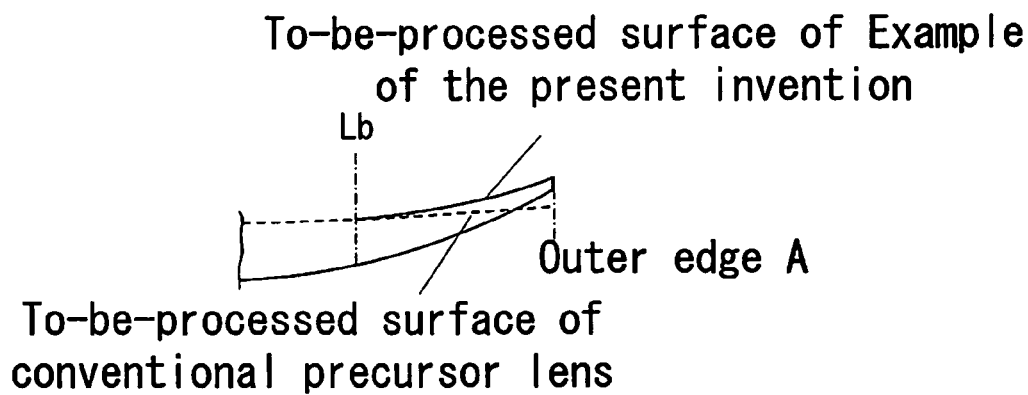
FIG. 7 is a descriptive view for describing a difference between processing performed in a conventional technique and processing performed in Example 1.

Additionally, a difference in shape at this position between the lens of Example 1 and the conventional lens is shown in FIG. 7. As shown in FIG. 7, the lens is eliminated inside the outer edge A of the material block 11 in the conventional precursor lens, whereas an edge thickness of 0.6 mm is secured in Example 1.

| Distance from center to lower side | Thickness in Comparative Example 1 | Amount of sag in Example | Thickness in Example after having been sagged |
| --- | --- | --- | --- |
| 16 mm | 1.2 mm | 0.0 mm | 1.2 mm |
| 17 mm | 1.1 mm | 0.0 mm | 1.1 mm |
| 18 mm | 1.0 mm | 0.0 mm | 1.0 mm |
| 19 mm | 0.9 mm | 0.0 mm | 0.9 mm |
| 20 mm | 0.8 mm | 0.1 mm | 0.9 mm |
| 21 mm | 0.7 mm | 0.1 mm | 0.8 mm |
| 22 mm | 0.6 mm | 0.2 mm | 0.8 mm |
| 23 mm | 0.5 mm | 0.3 mm | 0.8 mm |
| 24 mm | 0.4 mm | 0.3 mm | 0.7 mm |
| 25 mm | 0.3 mm | 0.4 mm | 0.7 mm |
| 26 mm | 0.1 mm | 0.5 mm | 0.6 mm |
| 27 mm | 0.0 mm | 0.6 mm | 0.6 mm |
| 28 mm | −0.1 mm | 0.8 mm | 0.7 mm |
| 29 mm | −0.3 mm | 0.9 mm | 0.6 mm |
| 30 mm | −0.4 mm | 1.0 mm | 0.6 mm |
| 31 mm | −0.6 mm | 1.2 mm | 0.6 mm |

The structure is formed as described above, and, as a result, the following effects are fulfilled in Example 1.

(1) If a precursor lens is manufactured based on such a rim-shaped lens prescription as above, the lack of an edge will occur at upper and lower positions as shown in FIG. 4. In the conventional technique, an edge thickness necessary for the precursor lens 15 was not able to be secured without making the center thickness of the precursor lens larger in order to prevent the lack of the edge.

However, if the lens is formed as in Example 1, a rim-shaped lens can be thinned, and an edge thickness necessary for the precursor lens 15 can also be secured.

(2) Processing can be performed according to rim-shaped-lens processing data until the process of the virtual rim shape L, and the upper and lower borderlines Lb are smooth curves and are crossed in the rightward/leftward direction, and therefore, when a processing tool passes through the borderlines Lb, large acceleration is never applied thereonto, and, as a result, defects never occur in the processing tool and the mechanism of the NC lathe.

(3) The virtual rim shape L is elliptical, and therefore it is easy to calculate the length and position of the borderline Lb with respect to the precursor lens 15, thus obtaining a calculative advantage.

(4) An amount of sag is given by using a plurality of kinds of functions, and therefore a moderate, smooth continuity with the surface inside the borderline Lb can be achieved, and the edge thickness can be prevented from becoming too large.

Example 2

In Example 2, the same SV lens is manufactured as in Example 1. Processing-data formation and a processing method are performed in the same way as in Example 1. Characteristics data of a lens to be manufactured is the same as that of Example 1. Additionally, the diameter of a precursor lens 15 to be manufactured, thickness setting, a fitting point, etc., are the same as those of Example 1.

In Example 2, a first virtual rim shape L1 was set as a structure that surrounds a rim-shaped lens and that corresponds to the virtual rim shape L of Example 1. The first virtual rim shape L1 is elliptical as the virtual rim shape L of Example 1, and its long diameter is 62 mm, and its short diameter is 42 mm. Therefore, the long diameter of the first virtual rim shape L1 coincides with the size of the precursor lens 15 (i.e., the diameter of the material block 11). A curved part of the virtual rim shape L that exists in the precursor lens 15L corresponds to a first borderline Lb1.

Additionally, in Example 2, a second virtual rim shape L2 surrounding the first virtual rim shape L1 was set. The second virtual rim shape L2 is elliptical, and has a long diameter of 62 mm and a short diameter of 52 mm. Therefore, likewise, the long diameter of the second virtual rim shape L2 coincides with the size of the precursor lens 15 (i.e., the diameter of the material block 11). A curved part of the second virtual rim shape L2 that exists in the precursor lens 15L corresponds to a second borderline Lb2.

Figure 8:
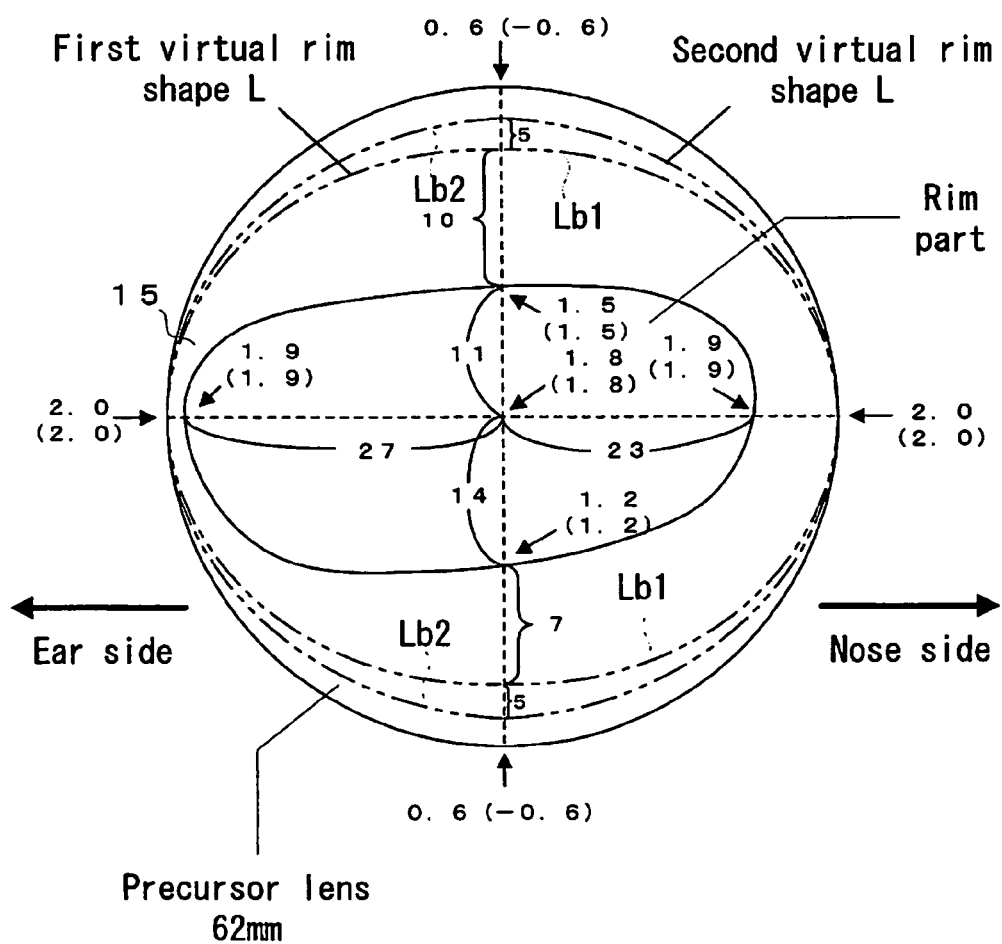
FIG. 8 is a descriptive view for describing numerical values of various data of Example 2 and a comparative example in a precursor lens.

In Example 2, the comparative example employed in Example 1 is likewise employed as a target for comparison. Example 2 and the conventional precursor lens are shown in FIG. 8. In FIG. 8, numerical values shown in parentheses are those of the conventional precursor lens.

Next, a detailed description will be given of a method for concretely setting an amount of sag (displacement magnitude) in an area from the edge of the virtual rim shape L to the edge of the material block 11 (i.e., to the edge of the precursor lens 15). In Example 2, an amount of sag is calculated as follows based on the borderline Lb in the same way as in Example 1.

Figure 9:
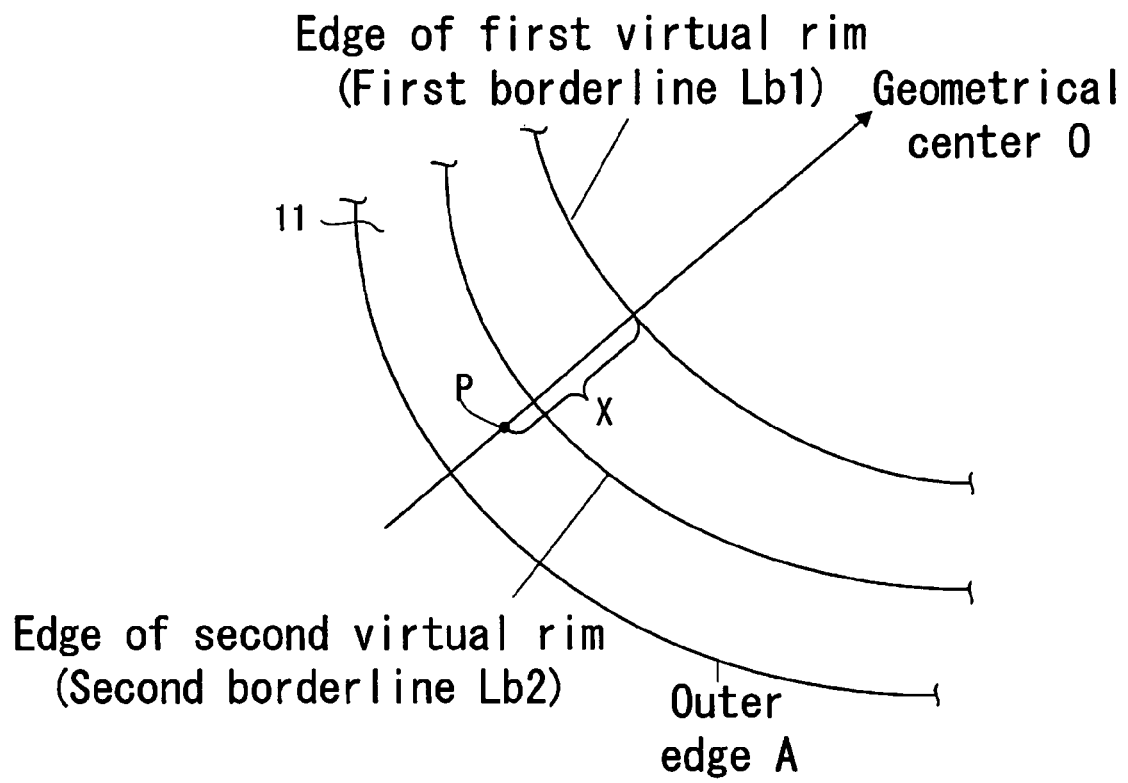
FIG. 9 is a descriptive view for describing a method for obtaining shape data in a circumferential direction in Example 2.

As shown in FIG. 9, an amount of sag is 0 inside the first borderline Lb1. Let a point on a straight line for calculating an amount of sag from the geometrical center O be "P," and let the distance from point P to an intersection between the first borderline Lb1 and the straight line be "x" in the same way as in Example 1.

1. With Respect to the Range of x=0 to the First Borderline Lb1

In Example 2, this range uses a quadratic function in which a sag displacement of 0.6 mm is made when x=7.5 mm. Specifically, the following function was used. When x=7.5, this function takes value 0.6, and the inclination (the first order differential value) is 0.16.

$$f(x) = X^2 * 0.6/56.25$$ [Formula 4]

2. With Respect to the Range of x=the First Borderline Lb1 to the Second Borderline Lb2

Figure 10:
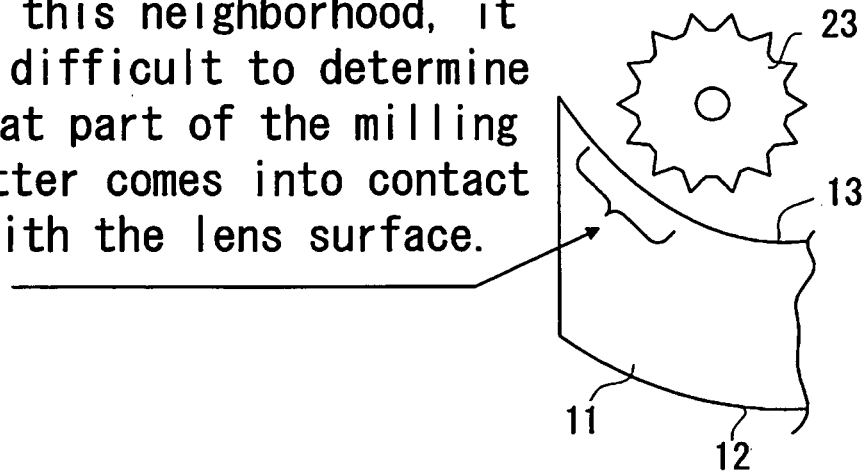
FIGS. 10 (a) and 10 (b) are descriptive views for describing the fact that the cutting position of the milling cutter becomes unfixed with respect to a surface to be processed.
Figure 10:
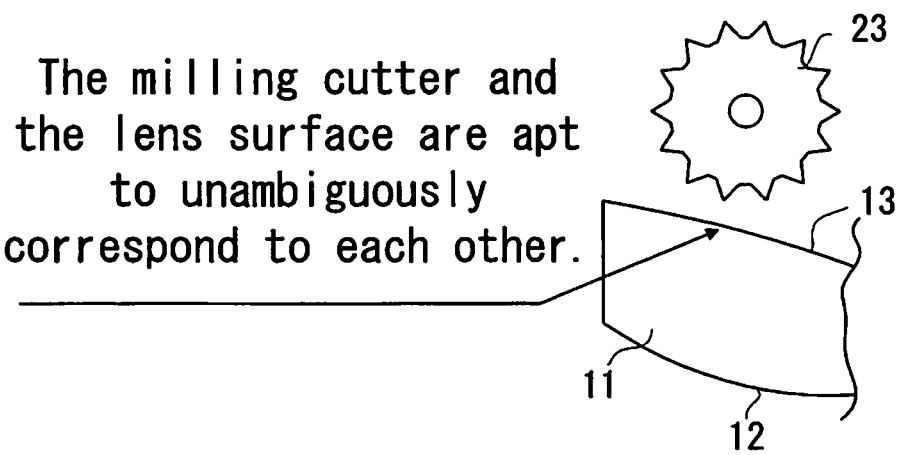

This range is substantially from 7.5 to 15.0 mm. This range prevents an amount of sag from being too large as mentioned above so that the thickness becomes too large at the lens edge. Additionally, the milling cutter 23 has a circular cutting part on its outer periphery, and therefore, in numerical formula 4 mentioned above, the to-be-processed surface of the material block 11 assumes a concave shape having a deep curve. As a result, the contact position of the cutting part formed on the outer periphery of the milling cutter 23, at which the cutting part comes into contact with the material block 11, becomes unfixed. This will be easily understood by the following way of thinking. For example, if the shape of a lens surface to be processed is a concave shape having an extremely deep curve as shown in FIG. 10 (a), the distance between the cutting part formed on the outer periphery of the milling cutter 23 and the surface to be processed is difficult to be unambiguously determined, and it becomes difficult to determine where the cutting part is brought into contact with the lens surface. On the other hand, the shape of the lens surface becomes shallow as shown in FIG. 10 (b), and the possibility that such an unfixed state will be caused becomes small if the contact position is, rather, on the convex side. As mentioned above, this range also has the intention of solving inaccuracy in processing without making the contact position of the milling cutter 23 unfixed.

Specifically, the following function was used.

When x=7.5, this function takes value 0.6, and the inclination (the first order differential value) is 0.16. When x=15.0 (edge position), this function takes value 1.2, and the inclination (the first order differential value) is 0.

$$f(x)6/56.25+0.32*x-1.2 \quad \text{[Formula 5]}$$

Figure 12:
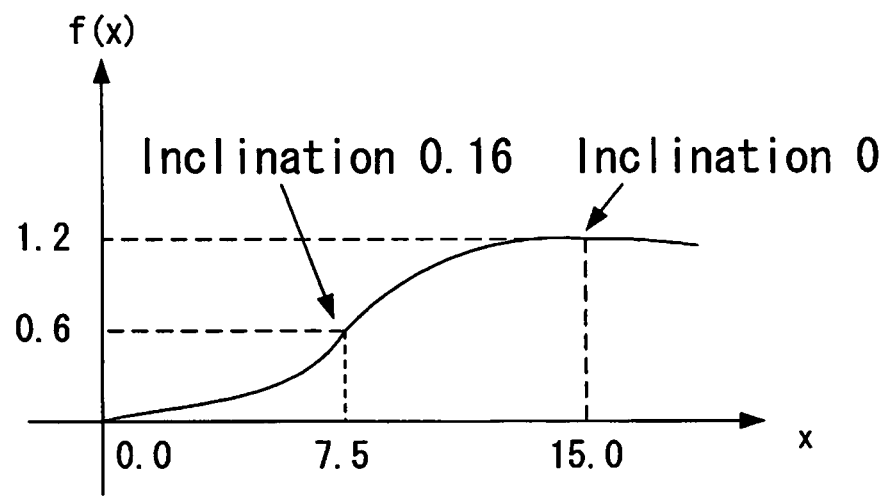
FIG. 12 is a characteristics graph of an amount of sag given to the outside of a first borderline in Example 2.
Figure 13:
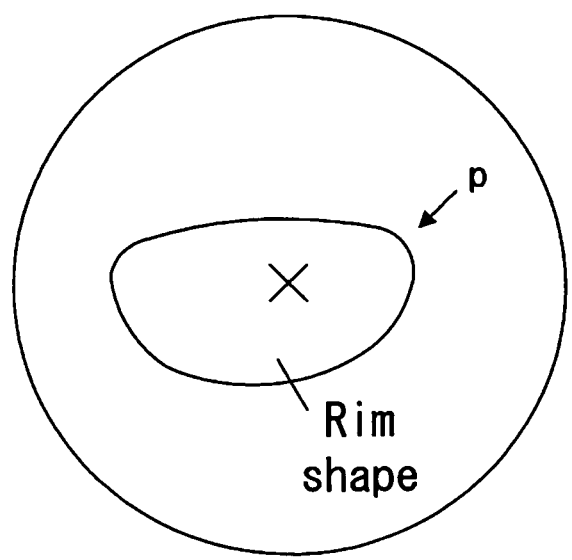
FIG. 13 is a descriptive view that indicates a problematic point in a state in which the shape of a rim-shaped lens has been set on a precursor lens.
Figure 14:
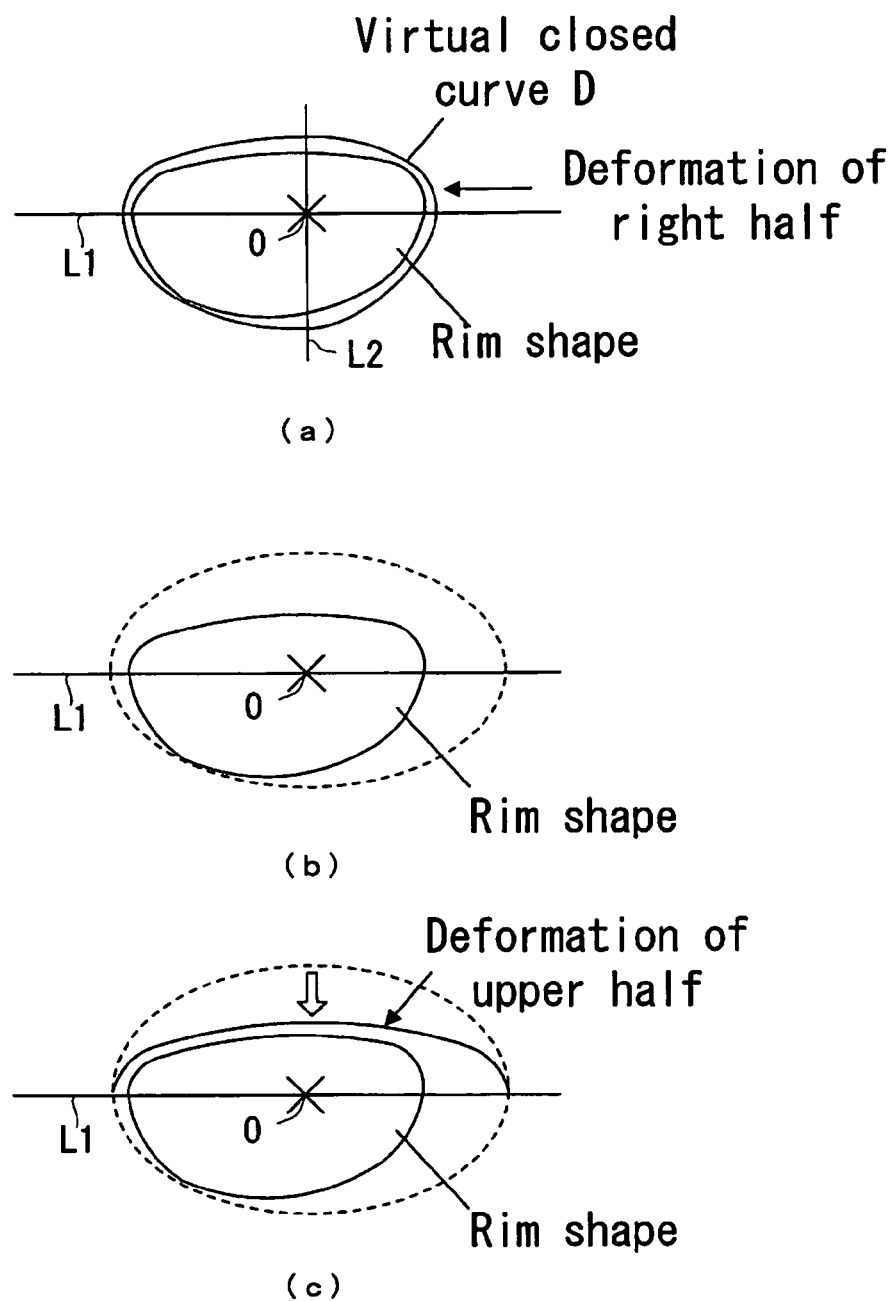
FIGS. 14 (a) to 14 (c) are descriptive views for describing a process for making a closed curve obtained by combining together ¼ of each of a plurality of ellipses differing in kind from each other.
Figure 15:
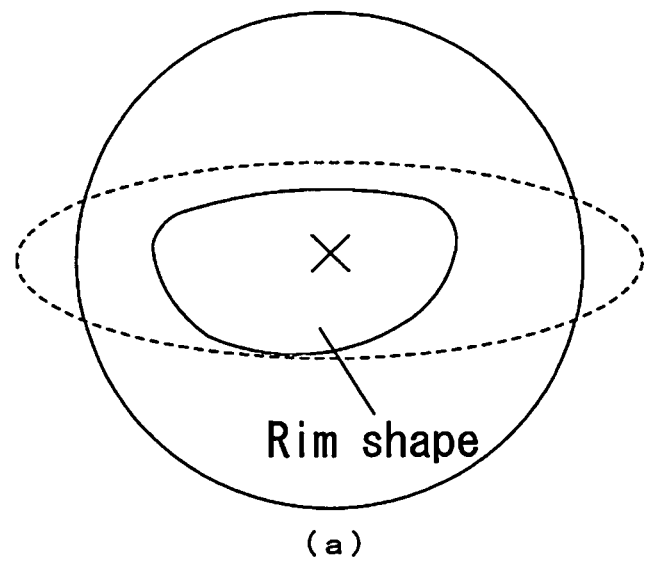
FIGS. 15 (a) and 15 (b) are descriptive views for describing the fact that whether a virtual shape strays or does not stray from a precursor lens is not indispensable.
Figure 15:
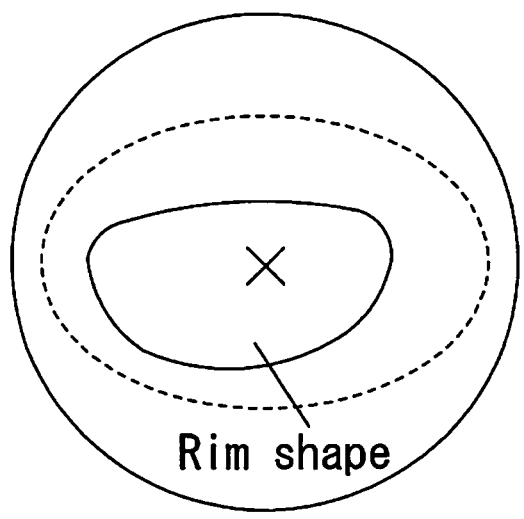

FIG. 12 is a characteristics graph of an amount of sag in which the ordinate axis indicates an amount of sag, and the abscissa axis indicates a distance from the edge of the virtual rim shape L.

The step of setting an amount of sag can be concretely programmed as follows. Hereinafter, "a" denotes an amount of sag. Although the lens was designed so that an amount of sag becomes comparatively large for easy understanding, an actual amount of sag is set smaller than an amount obtained by this numerical formula.

if (x>7.5) a=−0.01066666*x*x+0.32*x−1.2; //7.5 mm or larger Opposite shape Quadratic function
else if (x>0.0) a=0.01066666*x*x; //0 to 7.5 mm Quadratic function
else a=0.;

Next, a concrete description will be given taking, as an example, a cross-sectional shape on a straight line extended downwardly from the fitting point.

In Example 2, an amount of sag was adjusted below from a position 16 mm away from the center that is outside the first borderline Lb1 on the lower side so as not to eliminate the edge in the same way as in Example 1, and a resulting amount of sag was added according to numerical formula 4 mentioned above. Therefore, the curve outside this position is deeper than inside this position. Additionally, the amount of sag is again adjusted according to numerical formula 5 mentioned above below from a position 23.5 mm away from the center that is outside the second borderline Lb2 on the lower side, so that the curve is corrected to become shallower. Therefore, the amount of sag is adjusted so that the concave curve becomes convex outside this position. As a result, in this example, a part near the edge has a maximum thickness slightly outside a position 7.5 mm away from the edge position "A" toward the center (i.e., position 23.5 mm away from the center) (i.e., has a maximum thickness at a position about 24 to 25 mm away from the center). The thickness becomes 1.1 mm at that position. The thickness becomes smaller outside that position, and becomes 0.6 mm at the position of the outer edge A.

The lens thickness to the edge position "A" of the precursor lens based on a position 16 mm downward from the lens center is compared and shown in Table 2, taking the conventional precursor lens as a comparative example.

| Distance from center to lower side | Thickness in Comparative Example 1 | Amount of sag in Example | Thickness in Example after having been sagged |
|---|---|---|---|
| 16 mm | 1.2 mm | 0.0 mm | 1.2 mm |
| 17 mm | 1.1 mm | 0.0 mm | 1.1 mm |
| 18 mm | 1.0 mm | 0.0 mm | 1.0 mm |
| 19 mm | 0.9 mm | 0.1 mm | 1.0 mm |
| 20 mm | 0.8 mm | 0.2 mm | 1.0 mm |
| 21 mm | 0.7 mm | 0.3 mm | 1.0 mm |
| 22 mm | 0.6 mm | 0.4 mm | 1.0 mm |
| 23 mm | 0.5 mm | 0.5 mm | 1.0 mm |
| 24 mm | 0.4 mm | 0.7 mm | 1.1 mm |
| 25 mm | 0.3 mm | 0.8 mm | 1.1 mm |
| 26 mm | 0.1 mm | 0.9 mm | 1.0 mm |
| 27 mm | 0.0 mm | 1.0 mm | 1.0 mm |
| 28 mm | −0.1 mm | 1.1 mm | 1.0 mm |
| 29 mm | −0.3 mm | 1.2 mm | 0.9 mm |
| 30 mm | −0.4 mm | 1.2 mm | 0.8 mm |
| 31 mm | −0.6 mm | 1.2 mm | 0.6 mm |

Figure 11:
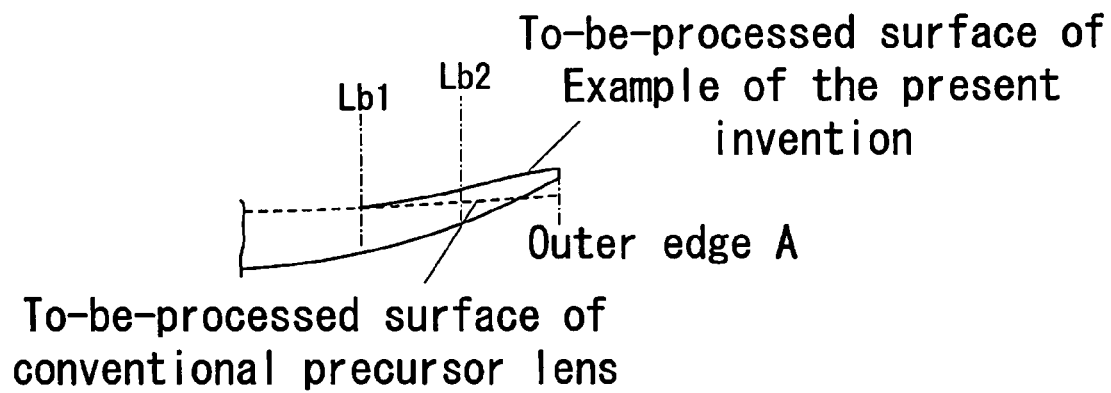
FIG. 11 is a descriptive view for describing a difference between processing performed in a conventional technique and processing performed in Example 2.

Additionally, a difference in shape at this position between the lens of Example 1 and the conventional lens is shown in FIG. 11. As shown in FIG. 11, the lens is eliminated inside the outer edge A of the material block 11 in the conventional precursor lens, whereas an edge thickness of 0.6 mm is secured, and the thickness at the position closer to the center is larger than that at the position of the edge in Example 2. As mentioned above, the curve outside the first borderline Lb1 is made deep so as not to eliminate the edge, and the curve outside the second borderline Lb2 is made shallower in proportion to an approach to the edge so as not to needlessly become thick.

The structure is formed as described above, and, as a result, the following effects are fulfilled in Example 2.

(1) If a precursor lens is manufactured based on such a rim-shaped lens prescription as mentioned above, the lack of an edge occurs at upper and lower positions as shown in FIG. 8. In the conventional technique, an edge thickness necessary for the precursor lens 15 was not able to be secured without making the center thickness of the precursor lens larger in order to prevent the lack of the edge.

However, if the lens is formed as in this example, a rim-shaped lens can be thinned, and an edge thickness necessary for the precursor lens 15 can also be secured.

(2) Processing can be performed according to rim-shaped-lens processing data until the process of the first virtual rim shape L1, and the upper and lower first borderlines Lb1 are smooth curves and are crossed in the rightward/leftward direction, and therefore, when a processing tool passes through the first borderlines Lb1, large acceleration is never applied thereonto, and, as a result, defects never occur in the processing tool and the mechanism of the NC lathe.

(3) The first virtual rim shape L is elliptical, and therefore it is easy to calculate the length and position of the first borderline Lb1 with respect to the precursor lens 15, thus obtaining a calculative advantage.

(4) The curve of the lens surface is made convex outside the second virtual rim shape L2 so that the edge thickness becomes small, and therefore the edge never uselessly becomes thick. Additionally, this makes it possible to solve such inaccuracy in processing without making the contact position of the milling cutter 23 with respect to the material block 11 unfixed.

The present invention can be modified and embodied as follows.

Although the second virtual rim shape L2 was set not to stray from the material block 11 in Example 2, this may be set to stray therefrom (for example, may have a size of a long diameter of 95 mm and a short diameter of 52 mm).

Although the ellipse center of each of the virtual rim shapes L, L1, and L2 coincided with the circle center of the material block 11 in Example 1 and Example 2, they may be deviated either rightwardly or leftwardly.

Although the ellipse of the virtual rim shape L was set to stray in the rightward/leftward direction of the precursor lens 15 in the above-mentioned examples, this may fall within the precursor lens 15. The reason is that, especially in a case in which it is apparent that the edge is eliminated when processing is performed on the ear side or on the nose side in accordance with rim-shaped-lens processing data, processing by which a predetermined edge thickness is given in the rightward/leftward direction is required without allowing the virtual rim shape L to stray in the rightward/leftward direction.

In a lens whose edge is eliminated on the ear side or on the nose side, the edge thickness in the up-down direction perpendicular thereto is secured in most cases. Generally, in the up-down direction, the distance from the virtual rim shape L to the edge of the round lens is longer. Therefore, if deforming is performed in all directions in the same way in accordance with a function of distance x from the virtual rim shape L, there will be a case in which the edge of the round lens becomes extremely thick in the up-down direction. To prevent this, it is permissible that an amount of deformation outside the virtual rim shape L is increased in the rightward/leftward direction, and is decreased in the up-down direction, and smooth continuity is formed in the diagonal direction therebetween.

Although an interpolation calculation was not performed in the above-mentioned examples because the shape of the virtual rim shape L can be specified, the surface to be processed may be calculated according to the interpolation calculation.

For example, when an amount of deformation is changed depending on a direction, such as an up-down direction or a rightward/leftward direction, there is a case in which the interpolation calculation is more advantageous to the calculation of the surface to be processed.

The ellipse taken by the virtual rim shape L can be inclined depending on the rim shape so as to correspond to its shape (i.e., can be disposed so that the long diameter of the ellipse dose not become perpendicular to the vertical axis of the precursor lens 15), or its center can be placed so as not to coincide with the geometrical center O.

Although the plus SV lens having astigmatic power was mentioned as one example in the above-mentioned examples, it is free to apply the invention to lenses other than the plus SV lens.

A precursor lens may be manufactured on the manufacturer side, and this precursor lens may be processed on the client side so as to obtain a rim-shaped lens, or, alternatively, a precursor lens may be manufactured on the manufacturer side, and this precursor lens may be processed on the same manufacturer side so as to obtain a rim-shaped lens.

Although a straight line used for simulation was set to extend from outside the lens to the fitting point of the lens (or to the geometrical center O) in the above-mentioned examples, there is not necessarily a need to extend therefrom to those points. In other words, those points are satisfied merely by being arbitrary points used as a basis for calculation.

Although shape data was formed by the CAM device, was then converted into processing data, and was output to the NC milling machine in the above-mentioned examples, the shape data may be input directly to the processing device for processing without being transmitted through the CAM device if the shape data can be converted into processing data on the processing device side.

Although the steps of processing the concave side of the precursor lens 15 by use of the milling cutter 23 were shown in the figures in the above-mentioned examples, the convex side thereof may be processed.

Although the part outside the second borderline Lb2 was designed to become shallower in proportion to an approach to the edge in Example 2, a part nearest to the edge may be designed so that the curve again becomes deep (i.e., so that a return to the original state is achieved).

With respect to others, the present invention can be freely embodied in a mode not departing from the gist of the present invention.

DESCRIPTION OF SYMBOLS

11: Material block, 15: Precursor lens, 23: Milling cutter as a processing means, Lb: Borderline, Lb1: First borderline, Lb2: Second borderline

The invention claimed is:

1. A method for manufacturing a precursor lens for a rim-shaped lens, the precursor lens having a circular or elliptical external shape, the precursor lens being processed into a rim-shaped lens by cutting off a peripheral edge thereof so as to be fitted in a predetermined spectacle rim, the precursor lens being provided with rotationally asymmetric lens characteristics corresponding to a prescription of a user, the method comprising:
   a processing data input step of inputting data to specify at least a shape of the rim-shaped lens, and
   a precursor lens manufacturing step of manufacturing the precursor lens by processing a material block by a processing means based on processing data of the rim-shaped lens,
   wherein an upper borderline and a lower borderline are imaginarily set to be extended in a rightward/leftward direction with a predetermined interval therebetween in an upper part and a lower part, respectively, of a rim shape of the rim-shaped lens,
   wherein processing is performed while reflecting the processing data until the upper and lower borderlines are reached, and
   wherein parts outside the upper and lower borderlines are processed while correcting the processing data so that an edge thickness of the manufactured precursor lens securely becomes larger than a predetermined thickness.

2. The method for manufacturing a precursor lens for a rim-shaped lens according to claim 1, wherein the upper borderline and the lower borderline are respectively virtual curves located at positions facing each other with a lens center therebetween, each serving as a part of a curve defined by I) or II) mentioned below:
   I) a single ellipse or circle,
   II) an outwardly convex closed-curve shape that does not make self-crossing and that is obtained by combining together parts of a plurality of curves selected from a single or a plurality of ellipses, circles, and hyperbolas so as to obtain a smooth continuity.

3. The method for manufacturing a precursor lens for a rim-shaped lens according to claim 2, wherein each of the upper and lower borderlines has a contact point being in external contact with a rim shape of the rim-shaped lens or a proximity point close thereto.

4. The method for manufacturing a precursor lens for a rim-shaped lens according to claim 3, wherein the material block has a predetermined convex or concave surface to be processed that has been pre-formed, and, in the step of manufacturing the precursor lens, processing is applied by the processing means onto either the convex or the concave surface to be processed.

5. The method for manufacturing a precursor lens for a rim-shaped lens according to claim 4, wherein the surface to be processed is an inner surface side of the lens in the step of manufacturing the precursor lens.

6. The method for manufacturing a precursor lens for a rim-shaped lens according to claim 5, wherein correction of the processing data denotes setting a lens-inner-surface-side curve in a lens cross section that passes through a lens center area so as to become deeper outside the borderlines than inside the borderlines.

7. The method for manufacturing a precursor lens for a rim-shaped lens according to claim 6, wherein setting a curve so as to become deeper outside the borderlines than inside the borderlines denotes that a curve obtained when the processing data is corrected becomes deeper outside the borderlines than a curve obtained when the processing data is not corrected.

8. The method for manufacturing a precursor lens for a rim-shaped lens according to claim 7, wherein a second borderline is imaginarily set outside each of the borderlines, and a deep curve set outside each of the borderlines is corrected so as to become shallower outside the second borderline.

9. The method for manufacturing a precursor lens for a rim-shaped lens according to claim 8, wherein a lens-inner-surface-side curve in a lens cross section that passes through a lens center area of the precursor lens is corrected to become convex outside the second borderline.

10. The method for manufacturing a precursor lens for a rim-shaped lens according to claim 9, wherein parts around the rim-shaped lens part processed in the step of manufacturing the precursor lens have at least an area that is contiguous to the rim-shaped lens part and that is continuous in all directions.

11. The method for manufacturing a precursor lens for a rim-shaped lens according to claim 1, wherein at least one of the upper and lower borderlines is a straight line extended in the rightward/leftward direction.

12. The method for manufacturing a precursor lens for a rim-shaped lens according to claim 11, wherein each of the upper and lower borderlines has a contact point being in external contact with a rim shape of the rim-shaped lens or a proximity point close thereto.

13. The method for manufacturing a precursor lens for a rim-shaped lens according to claim 12, wherein the material block has a predetermined convex or concave surface to be processed that has been pre-formed, and, in the step of manufacturing the precursor lens, processing is applied by the processing means onto either the convex or the concave surface to be processed.

14. The method for manufacturing a precursor lens for a rim-shaped lens according to claim 13, wherein the surface to be processed is an inner surface side of the lens in the step of manufacturing the precursor lens.

15. The method for manufacturing a precursor lens for a rim-shaped lens according to claim 14, wherein correction of the processing data denotes setting a lens-inner-surface-side curve in a lens cross section that passes through a lens center area so as to become deeper outside the borderlines than inside the borderlines.

16. The method for manufacturing a precursor lens for a rim-shaped lens according to claim 15, wherein setting a curve so as to become deeper outside the borderlines than inside the borderlines denotes that a curve obtained when the processing data is corrected becomes deeper outside the borderlines than a curve obtained when the processing data is not corrected.

17. The method for manufacturing a precursor lens for a rim-shaped lens according to claim 16, wherein a second borderline is imaginarily set outside each of the borderlines, and a deep curve set outside each of the borderlines is corrected so as to become shallower outside the second borderline.

18. The method for manufacturing a precursor lens for a rim-shaped lens according to claim 17, wherein a lens-inner-surface-side curve in a lens cross section that passes through a lens center area of the precursor lens is corrected to become convex outside the second borderline.

19. The method for manufacturing a precursor lens for a rim-shaped lens according to claim 18, wherein parts around the rim-shaped lens part processed in the step of manufacturing the precursor lens have at least an area that is contiguous to the rim-shaped lens part and that is continuous in all directions.

* * * * *